Sept. 6, 1966   J. M. KERWIN   3,270,352
PORTABLE LAVATORY PLUMBING SYSTEM
Filed Nov. 14, 1963   2 Sheets-Sheet 1
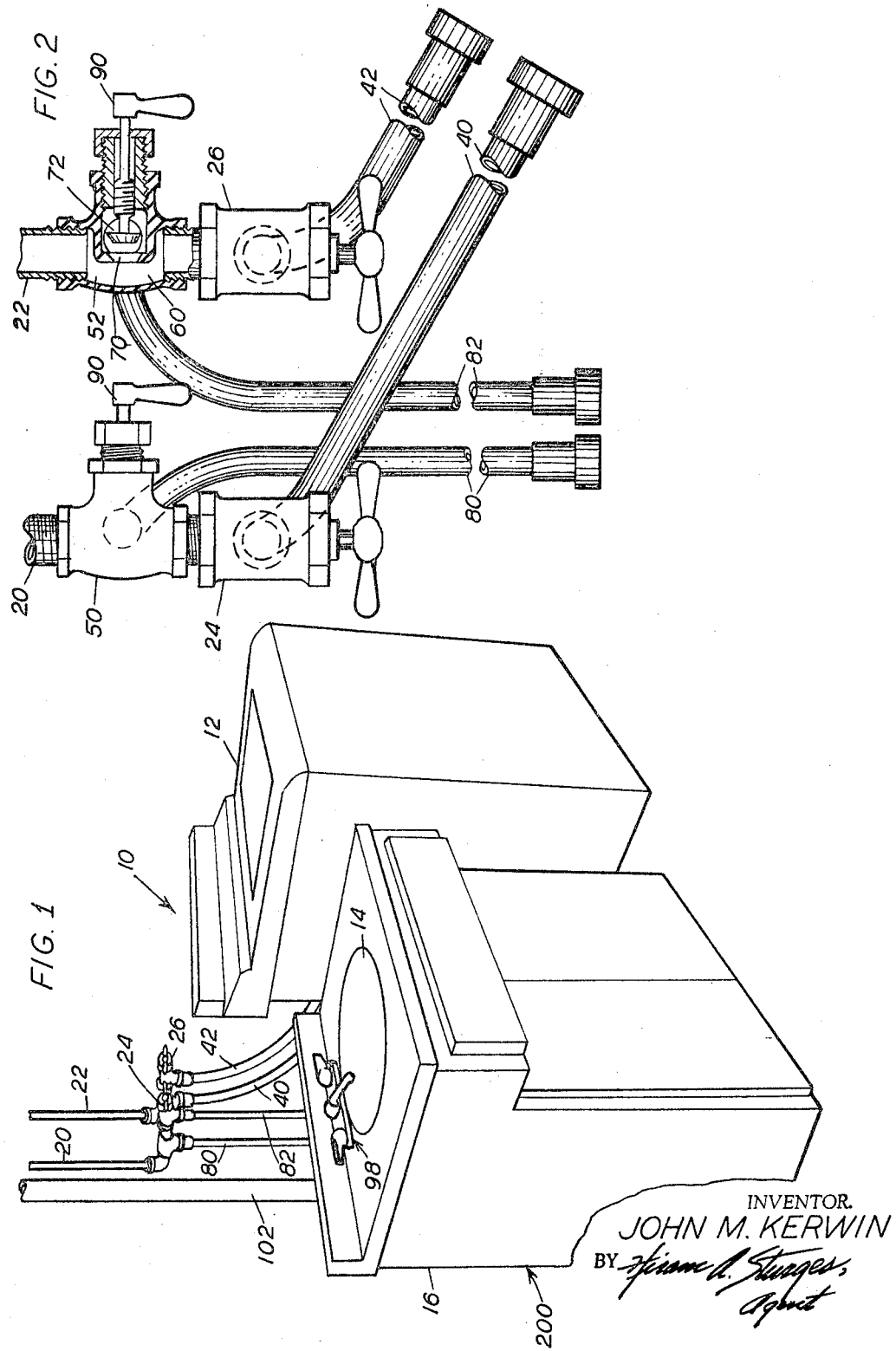
INVENTOR.
JOHN M. KERWIN
BY Hiram A. Sturges,
Agent Sept. 6, 1966 J. M. KERWIN 3,270,352
PORTABLE LAVATORY PLUMBING SYSTEM
Filed Nov. 14, 1963 2 Sheets-Sheet 2
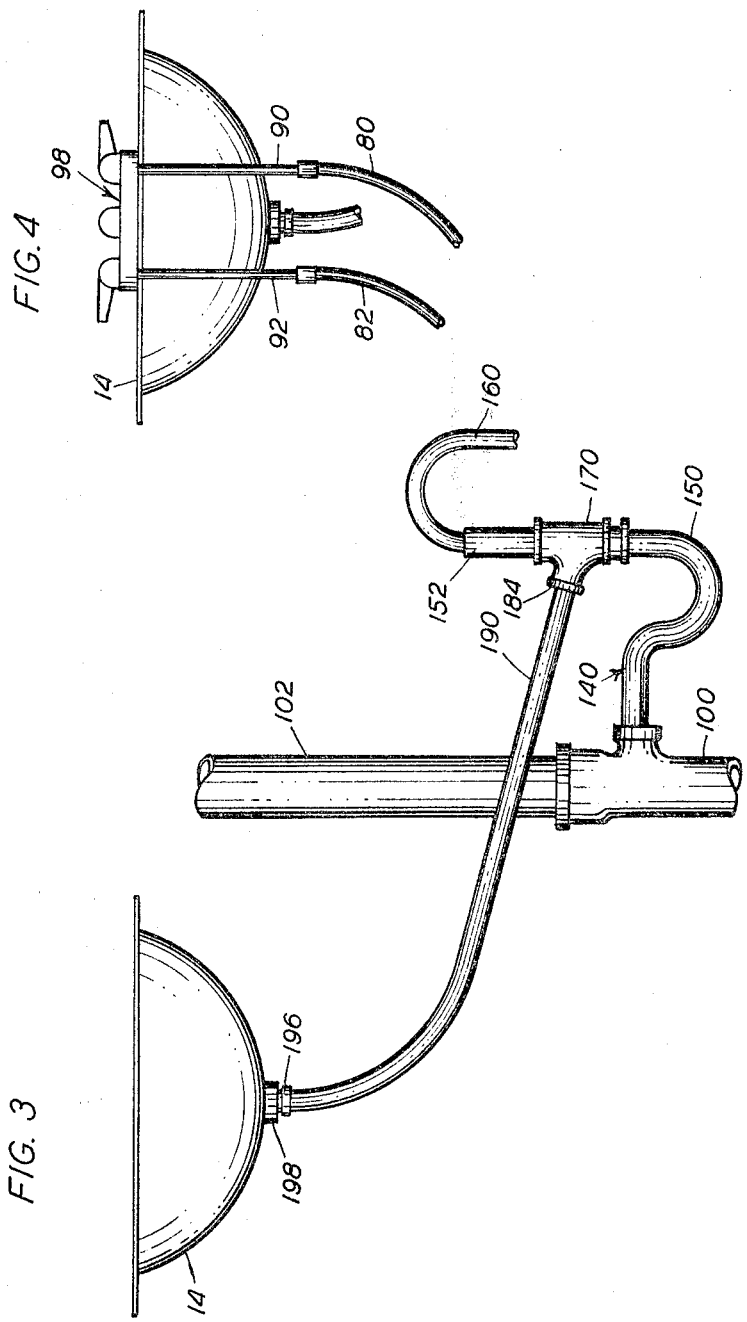
INVENTOR.
JOHN M. KERWIN
BY 3,270,352
PORTABLE LAVATORY PLUMBING SYSTEM
John M. Kerwin, 11022 Valley St., Omaha, Nebr.
Filed Nov. 14, 1963, Ser. No. 323,689
1 Claim. (Cl. 4—192)

This invention relates to the provision of a system for the connection of a lavatory unit and a washing machine to hot and cold water lines in a new way by which it is possible for a home owner to install a lavatory without need for the expense of the services of a professional plumber.

Heretofore the installation of a lavatory has required the services of a professional plumber and although hot and cold water lines have been available in basements for use with washing machines, no use of these lines for the installation of a lavatory has been made, to my knowledge, without the interconnection being of a type requiring the relatively expensive services of a professional plumber.

More particularly it is an object of this invention to provide the insertion of by-pass valves in lines leading from hot and cold water lines to the conventional valves to which washing machine hoses are conventionally connected, whereby hoses from the by-pass valves can lead to a lavatory and the by-pass valve can be turned off when desired without interferring with the operation of the washing machine.

Yet a further object is to provide this new combination in further combination with a Y fitting in the drain pipe used by the washing machine, whereby a drain line leading from the lavatory can be easily inserted therein by an amateur installer.

A particular object is to provide an unusually economical way to provide a home with an extra lavatory.

Other and further objects and advantages of the present invention will be apparent from the following detailed description, drawings and claims, the scope of the invention being limited to the drawings themselves as the drawings are only for the purpose of illustrating a way in which the principles of this invention can be applied. Other embodiments of the invention utilizing the same or equivalent principles may be used and structural changes may be made as desired by those skilled in the art without departing from the present invention and the purview of the appended claims.

In the drawings:

FIGURE 1 is a perspective view of a lavatory and a dish washing machine together with hot and cold water connections therefor.

FIGURE 2 is a detailed top plan view showing the attachment assemblies for hot and cold water lines of the hose washer and portable lavatory of FIGURE 1, with portions of a by-pass valve being broken away to show interior construction.

FIGURE 3 is a front elevation showing in detail the drain assembly of the system of this invention.

FIGURE 4 is a rear view of facuet fittings of the lavatory showing the hoses connected thereto, the lavatory proper being shown, but the cabinet being removed for convenience of illustration.

Referring to FIGURE 1, the clothes washer-lavatory combination of this invention is there generally indicated at 10, which embodies a clothes washer 12 and a lavatory 14, the lavatory preferably being mounted in a cabinet 16.

Conventionally a dishwasher is served by a hot water line 20, a cold water line 22, deliverying hot and cold water respectively through valves 24 and 26, the latter being manually controllable and are connected to hot and cold water hoses 40 and 42.

In accordance with this invention, however, by-pass valves 50 and 52 are inserted between the valves 24 and 26 and the hot and cold lines 20 and 22 respectively, as best seen in FIGURE 2.

Each by-pass valve 50 and 52 is provided with a by-passageway 60, which latter is always open so that the presence of the valves 50 and 52 does not interfere at any time with flow to the valves 24 and 26.

Each by-pass valve 50 and 52 has an opening 70 to a chamber 72, which latter is connected in my invention to a hot or cold lavatory hose 80 or 82 respectively.

The by-pass valves 50 and 52 each have a manually controllable handle 90 for shutting off flow through respective openings 70, for thereby shutting off flow to the hoses 80 and 82.

As best seen in FIGURE 4, the hoses 80 and 82 are connected to hot and cold faucet lines 90 and 92 of a facuet fitting 98 disposed along sides of the lavatory 14.

Conventionally the dishwasher 12 has a drain pipe 100 associated with it, as best seen in FIGURE 3, the drain pipe being vented by a pipe 122.

Suitable fittings, generally indicated at 140, and including a trap 150 are ordinarily and conventionally connected to a pipe 152, into which the drain hose 160 of the dish washer is inserted. However, in accordance with this invention a Y fitting 170 is inserted between the trap 150 and the pipe 152, the Y having a side opening 184 into which the drain hose 190 of the lavatory 14 is inserted.

In accordance with this invention the drain hose 160 is connected by clamp means 196 to the drainage outlet 198 of the lavatory 14.

The cabinet 16 can be moved about to different positions in a basement or in whatever room the washing machine 12 is located inasmuch as its hoses 80, 82 and 190 are all flexible and can be of any length and for that reason the lavatory 14 and its cabinet 16 can be referred to generally as a portable lavatory 200.

As thus described this invention is believed to fulfill all of the objects above set forth to provide a system giving a new way for a home owner to have an extra lavatory in his house at a minimum expense of installation.

For the foregoing description, it is thought to be obvious that a portable lavatory constructed in accordance with my invention is particularly well adapted for use, by reason of the convenience and facility with which it may be assembled and operated, and it will also be obvious that my invention can be changed and modified without departing from the principles and spirit thereof, and for this reason, I do not wish to be understood as limiting myself to the precise arrangement and formation of the several parts herein shown in carrying out my invention in practice, except as claimed.

I claim:

In combination with hot and cold water lines each connected to a manually controllable valve, a clothes washer, hot and cold lines leading from said valves to said clothes washer, the provision of by-pass valves in said lines between said valves and the remainder of said lines, hot and cold water lines leading from said by-pass valves, a lavatory, faucet means for said lavatory having hot and cold fittings, means interconnecting said hot and cold lines from the by-pass valves and said hot and cold lavatory fittings, said lavatory having a drainage fitting, a drain pipe, a hose receiving pipe, means for connecting said hose receiving pipe to said drain pipe, a clothes washer hose disposed in operable relation to said hose receiving pipe, said means for connecting said hose receiving pipe and said drainage pipe comprising a Y fitting, a lavatory drainage hose connected to the drainage fitting of said lavatory, and in operable position with said opening of said Y fittings whereby said Y fitting receives drainage from said lavatory.

No references cited.

LAVERNE D. GEIGER, *Primary Examiner.*

H. GROSS, *Assistant Examiner.*